Figure 1:
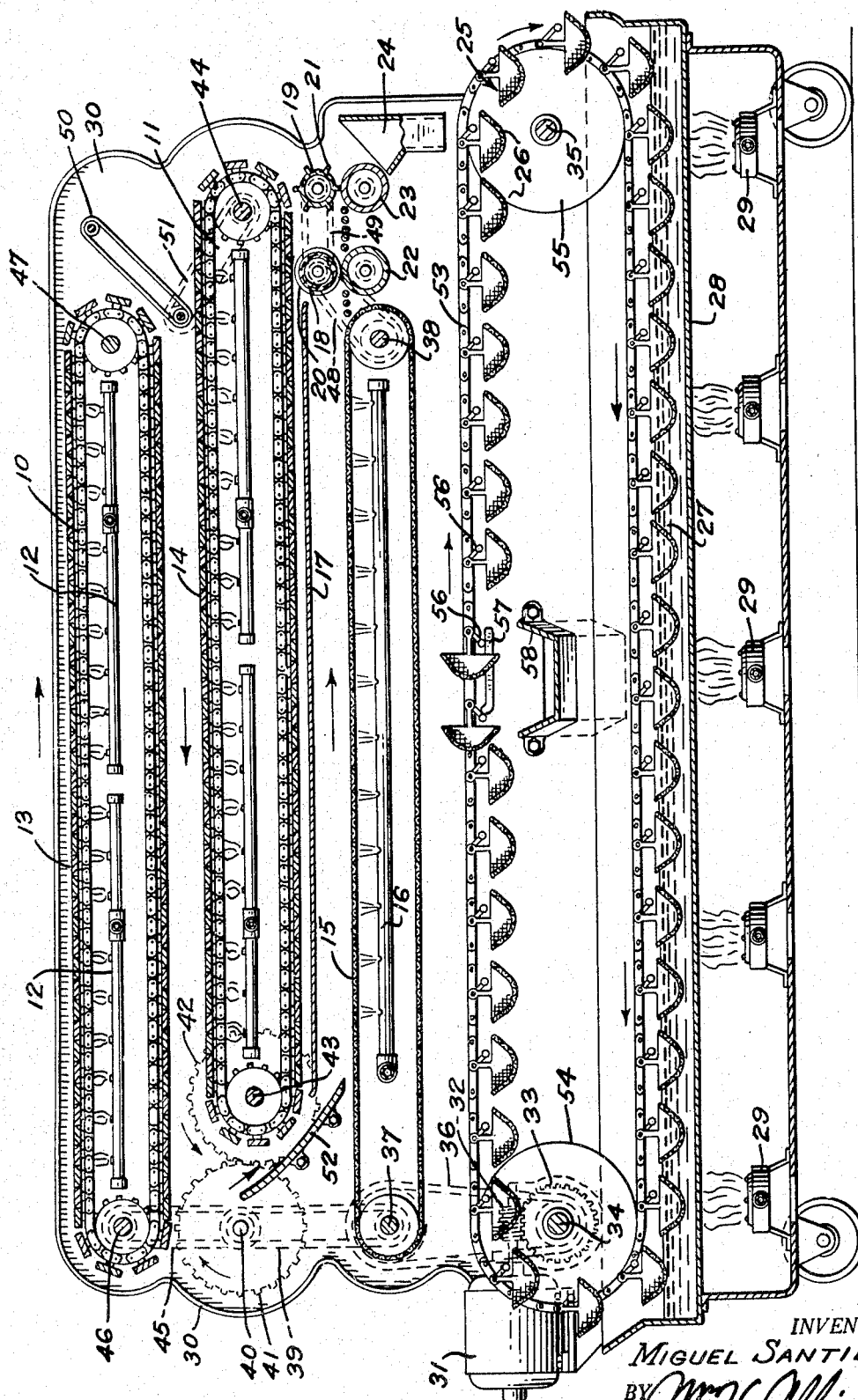

March 29, 1938.    M. SANTILLAN    2,112,309
GRILL FOR TORTILLAS AND THE LIKE
Filed Oct. 16, 1936    2 Sheets-Sheet 1

INVENTOR.
MIGUEL SANTILLAN.
BY Wm H. Atkinson
ATTORNEY.

March 29, 1938. M. SANTILLAN 2,112,309
GRILL FOR TORTILLAS AND THE LIKE
Filed Oct. 16, 1936 2 Sheets-Sheet 2

INVENTOR.
MIGUEL SANTILLAN.
BY
ATTORNEY.

Patented Mar. 29, 1938

2,112,309

UNITED STATES PATENT OFFICE 2,112,309

GRILL FOR TORTILLAS AND THE LIKE

Miguel Santillan, San Francisco, Calif.

Application October 16, 1936, Serial No. 105,937

5 Claims. (Cl. 53—5)

The present invention relates to a machine for grilling and otherwise cooking tortillas and edible cakes of like character, and more particularly to a new and improved structure and arrangement of parts for carrying out the grilling and cooking operations.

Tortillas, which are of Mexican origin, are flat cakes varying from approximately $\frac{1}{16}''$ to $\frac{3}{16}''$ in thickness and from 4" to 10" in width. These cakes are made of corn, the corn being boiled in a weak lime water, ground and mashed into a thick dough from which the cakes may be pressed or otherwise formed by hand or by suitable machines provided for that purpose.

In the making of tortillas it is desirable to grill the rather thin cakes in stages. This is done by subjecting the lower surface of the cakes to heated plates, and turning them over one or more times, to thereby form a crust on both sides, which is expanded by the steam formed from the moisture within the dough. The machine consists of a plurality of superimposed moving endless conveyors of special construction having means associated therewith to maintain the surface of the conveyors heated, and having at the ends of the conveyors a novel means for turning the cakes and delivering them to a second similar conveyor or other element of the machine.

Recently it has been discovered that when these tortillas are first grilled and then subjected to a French frying operation in deep fat, they provide a very palatable food product which has found considerable demand as a side dish in taprooms and bars, and because of their cheapness they provide an economical substitute for salted nuts and potato chips which are now frequently provided in taprooms.

An object of the invention is to provide a compact machine which will combine both the grilling and cooking operations described above in a single unit.

Another object of the invention is to provide a new and improved grill structure which will provide a substantially smooth and closed grilled surface.

Another object of the invention is to provide a novel form of turning and transfer means for transferring the article being grilled from one traveling grill to another in a manner which will avoid breaking and insure a positive transfer of the cake at this point.

Another object of the invention is to provide a novel arrangement wherein the tortillas, after being grilled, will be cooled and cut in a suitable and convenient size to form small wafers that may be subsequently fried in deep fat or oil.

Another object of the invention is to provide a novel form of cutting means through which the grilled cakes may pass in a continuous manner.

A further object of the invention is to provide an improved deep fat frying machine for treating articles of the character described, in which the articles are collected and carried through the frying fat in a continuous manner, after which, upon the completion of the frying operation, they are discharged from the machine.

Other objects and advantages of the invention will be in part evident to those skilled in the art and in part pointed out in the description taken in connection with the accompanying drawings wherein there is shown, by way of illustration and not of limitation, a preferred embodiment of the invention.

Figure 2:
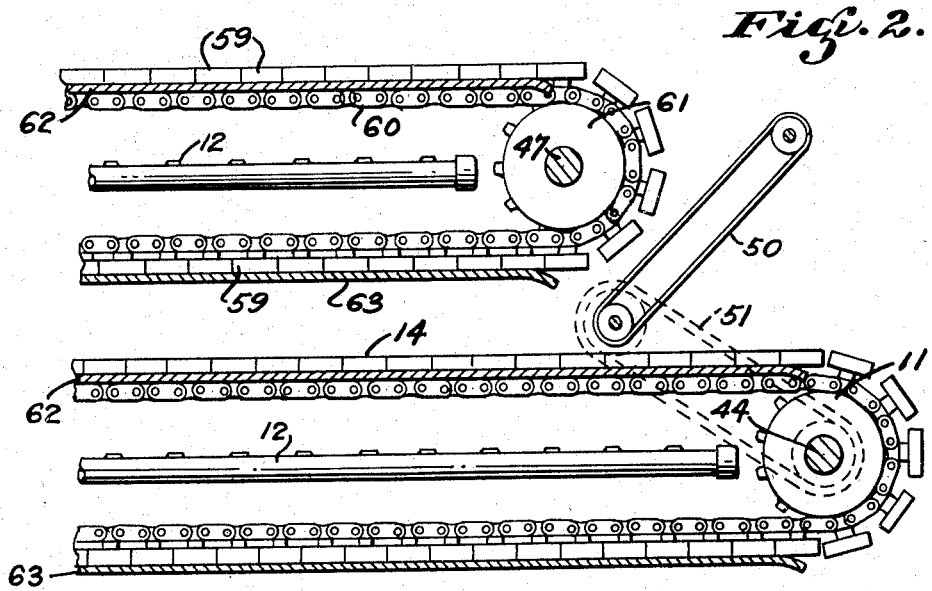
Figure 3:
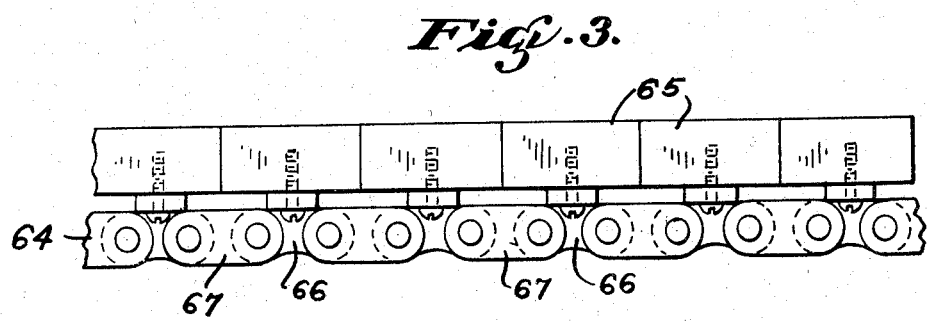
Figure 4:
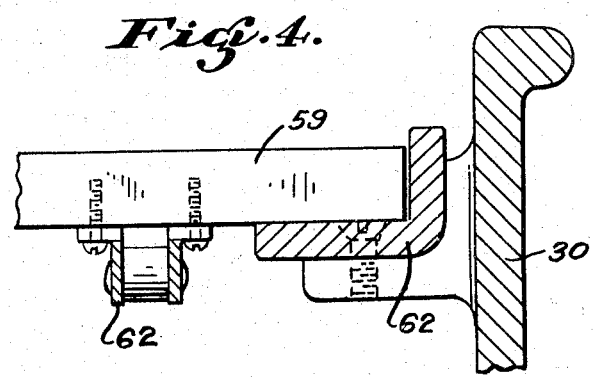
Figure 5:
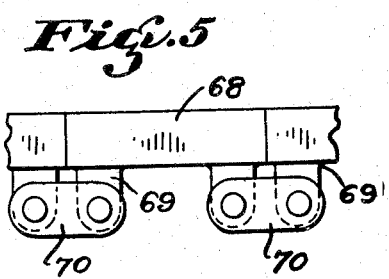

In the drawings:

Figure 1 is a vertical sectional view of a machine constructed in accordance with this invention and showing the arrangement and details of the parts, Figure 2 is a fragmentary sectional view of a portion of the machine shown in Figure 1, Figure 3 is a view showing details of a portion of a preferred form of grill construction, Figure 4 is a fragmentary view showing the manner of supporting the grill forming members, and Figure 5 is a fragmentary view showing a modified form of a grill element.

For the purpose of describing the present invention there is shown in Figure 1 of the drawings a complete machine in which there are provided two continuously moving and heated grill forming conveyor systems, designated by the numerals 10 and 11. The grills formed by the conveyor systems 10 and 11 are, as will be understood, located along the top surfaces thereof, and arranged within the conveyor system immediately below the upper horizontal portions there are suitable heating units 12, which may be of the gas burner type or of the electric resistance type. The conveyor systems 10 and 11 are arranged to be driven so that their upper or grill forming surfaces, designated by the numerals 13 and 14, will travel in opposite directions, and in this manner the articles being grilled will be carried first in one direction and then in another until they are discharged from the machine. Below the lowermost conveyor system 11 there is an additional conveyor 15 of open construction upon which the grilled articles are adapted to be carried over a cooling means which, in the drawings, is shown as a pipe 16 from which jets of cooling air are discharged. Immediately above the conveyor 15 there is a baffle 17 which serves to prevent a cooling of the grill forming conveyor 11 along its lower path of travel.

With the above described arrangement it will be seen that as the articles pass through the machine they will move from one grill forming conveyor to the other and finally to the conveyor 15, where the grilled articles will be cooled by the jets of air from the pipe 16. If the article is desired in this form, it will be delivered from the conveyor 15 in a cooled condition. However, since the present invention also contemplates a further treatment of the grilled articles, there is located at the discharge end of the conveyor 15, two cutting rollers 18 and 19 which respectively carry properly disposed cutting blades 20 and 21. The blades 20 upon the cutting roll 18 extend concentrically around the roller and the blades 21 upon the roller 19 are arranged in spaced relation longitudinally of the roller 19. The cutting rollers 18 and 19 are adapted to cooperate with underlying rollers 22 and 23, so that when the grilled articles pass between the rollers 18 and 22 they will be first cut into long strips and these strips will then be substantially cut into shorter lengths, depending upon the number and spacing of the blades 21 upon the cutting roller 19. Arranged below the cutting roller 19 there is a suitable hopper 24 into which the cut pieces of the articles are adapted to drop. Below the above described conveyor systems 10, 11, and 15 and the hopper 24 there is an additional conveyor system, designated generally by the numeral 25. This conveyor system 25 carries a plurality of basket-like receptacles 26 that are adapted to receive the cut pieces as they are discharged from the hopper 24, as will be described in more detail hereinafter. At this point it will be sufficient to say that the baskets 26 carried by the conveyor system 25 are adapted, when in movement, to dip into a deep frying fat 27 which is maintained at a frying temperature in a container 28 by means of gas burners or other suitable heating means 29.

Before describing the details of the several above conveyor systems, it should be pointed out that these conveyor systems, are all mounted one above the other between a pair of vertically disposed longitudinally extending side frames 30 that carry the bearings for the conveyor shafts and also support the other cooperating elements of the machine. All of the moving elements of the machine are adapted to be driven in the conventional manner by a single motor 31. As shown, the motor 31 operates through a worm 32 that engages a worm wheel 33 upon a shaft 34, which in cooperation with a shaft 35 serves to support the conveyor system 25. The cooling conveyor 15 is shown as driven from the shaft 34 by means of a sprocket chain or belt 36 that drives a shaft 37 which cooperates with a shaft 38 to support the conveyor system 15. A sprocket chain 39 extends from the shaft 37 to a countershaft 40 upon which there is a gear 41 that meshes with a gear 42 upon a shaft 43 that in cooperation with a shaft 44 serves to support the conveyor system 11. An additional sprocket chain 45 connects the shaft 40 with a shaft 46 which in combination with a shaft 47 serves to support the grill forming conveyor 10. The cutting rolls 18 and 19 at the end of the cooling conveyor system 15 are shown as driven by means of sprocket chains 48 and 49 in a manner which, as shown, will be readily understood by those skilled in the art. At the discharge end of the conveyor system 10 there is also provided a continuously moving belt-like member 50 that is driven from the shaft 44 by means of a sprocket chain 51. The purpose of this belt-like member 50 is to insure a positive turning of the grilled articles as they fall from the grill surface 13 of the conveyor 10 to the grill surface 14 of the conveyor 11. A belt-like member 50 is necessary at this point, as the top surface of the grilled articles are usually soft and doughy and cannot be transferred by a simple slide. At the discharge end of the conveyor 11, however, it is possible, since the articles discharged at this point will be grilled on both sides, to provide a simple inclined slide 52 for directing the grilled articles onto the surface of the cooling conveyor 15.

It is believed that the construction and operation of the conveyor 25 with its baskets 26 will be fully understood upon reference to the drawings and the preceding description. However, it may be further pointed out that the conveyor system 25 comprises two continuous and spaced chains 53 that operate over cooperating sprockets 54 and 55 carried respectively by the transversely extending shafts 34 and 35. The baskets 26 are disposed at equally spaced points and extend transversely between the two chains 53. The widths of the baskets 26 are such that they engage each other in the horizontal zones of the conveyor system 25 and thus form a continuous multiple basket-like surface along the top and bottom paths of travel of the chains 53. The baskets 26 are pivoted so that they swing freely about their point of connection with the chains 53 and they are each provided with a rocking arm 56 which is adapted to engage a basket rocking cam 57 located along the upper path of the baskets intermediate the ends of the conveyor system 25. Immediately below the basket rocking cam 57 there is an inclined transversely extending chute 58 which serves to receive the cooked articles after they have been grilled and passed through the deep frying fat 27, as above described. With this arrangement it will be seen that as the cut pieces of the grilled articles are discharged from the cutting rolls 19 and 23 they will drop through the hopper or chute 24 and be directed into the baskets 26 of the conveyor system 25 located immediately therebelow.

Reference is now made to Figure 2 of the drawings for a description on the details of the construction of the grill forming conveyors 10 and 11. As here shown, the grill surface of the conveyor system 10 comprises a plurality of transversely extending metal bars 59 which are connected adjacent their ends to spaced sprocket chains 60 that operate over sprockets 61 mounted upon the transversely extending shafts 46 and 47, as shown in Figure 1 of the drawings. The transversely extending bars 59 preferably have a width no greater than that of a link of the chain, and in their travel between the sprockets 61 they are supported by stationary guide rails 62 which engage the ends of these bars, as will hereinafter be pointed out. The guide rails 62 may be made substantially level or they may be bowed downward slightly between their ends so that the weight of the bars 59 and the tension upon the links 60 of the chains 53 will draw the bars 59 into close engagement with each other and form a substantially tight grilling surface along the top surface of the conveyor system. Only a very slight downward bowing of the guide rails 62 is necessary to accomplish this result. Along the lower path of travel of the conveyor system 10 there is a similar guide rail 63 which serves to support the bars 59 in their lower path of travel and provide a uniform clearance with the underlying grill surface 14 formed by the conveyor system 11. At this point it will be understood that the conveyor system 11 is constructed in a manner similar to that described above.

In Figure 3 of the drawings there is shown in detail a length of a conveyor chain 64 in which transversely extending grill forming bars 65 are each secured to sprocket chain blocks 66 which are secured end to end by means of links 67. With this arrangement it will be readily seen that when the bars 65 are unsupported between the ends of the grill they will have a tendency to become cramped together so as to form a tight engagement between the bars 65 at their upper surfaces. It is to prevent too great a sag in the grill surface due to this action that the two supporting rails 62 are provided at the ends of the bars 65. These rails 62, as suggested above, may be level or they may be curved downwardly to permit a predetermined cramping action between the bars 65, as above described. The manner in which the guide rails 62 and 63 engage the ends of the transversely extending grill forming bars 59 and 62 will be understood from an inspection of Figure 4 of the drawings, wherein the rails 62 are shown as supported by and projecting inwardly from the side frames 30 which, as stated above, serve to support the various elements of the machine.

In Figure 5 of the drawings there is shown a modified form of grill forming bar, designated by the numeral 68. In this arrangement the bars 68 are each provided with downwardly extending lugs 69 that are connected together by means of chain links 70. In this latter construction it will be seen that the grill forming bars 68 form the links of the conveyor system.

While I have, for the sake of clearness and in order to disclose the invention so that the same can be readily understood, described and illustrated a specific arrangement, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is—

1. In a machine of the character described, the combination of a plurality of superimposed continuously moving grill surfaces, means for heating said grill surfaces, a continuously moving conveyor system of perforated construction below the heated grills, means for maintaining a circulation of cooling air through said latter conveyor, and means for transferring the articles to be grilled from one to the other of said grill surfaces and finally to said latter conveyor where after grilling said articles will be cooled before being discharged from the machine.

2. In a machine of the character described, the combination of a frame, a pair of parallel transversely extending shafts journaled upon said frame each of said shafts having spaced sprockets secured thereupon, a pair of spaced longitudinally extending chains operating in parallel relation over said sprockets, a plurality of transversely extending grill forming members secured adjacent their ends to each of said chains, and supporting rails carried by said frame adapted to engage the ends of said transversely extending members and support said members independently of said chains in a substantially horizontal plane between said shafts.

3. In a machine of the character described, the combination of a frame, a pair of parallel transversely extending shafts journaled upon said frame each of said shafts having spaced sprockets secured thereupon, a pair of spaced longitudinally extending chains operating in parallel relation over said sprockets, a plurality of transversely extending grill forming bars secured at their ends in close relation upon said chains, and longitudinally extending supporting rails upon said frame adapted to engage the ends of said transversely extending members and support said transversely extending members independently of said chains, said rails being curved downward between their ends whereby said transversely extending members will be cramped tightly together as they are moved over said supporting rails by said chains.

4. In a machine of the character described for grilling flat articles of food, the combination of a continuously moving grill upon which the articles are grilled, heating means for maintaining a grilling temperature at the surface of said grill, a conveyor adapted to receive articles as they are discharged from said grill surface, means associated with said latter conveyor for maintaining a circulation of cooling air upon the grilled articles carried thereby, and means at the discharge end of said latter conveyor adapted to cut the grilled and cooled articles into small pieces.

5. In a machine of the character described, the combination of a continuously moving grill, heating means for maintaining a grilling temperature at the surface of said grill, a conveyor adapted to receive the grilled articles from said moving grill surface, means associated with said latter conveyor for maintaining a circulation of cooling air upon the grilled articles carried thereby, means at the discharge end of said latter conveyor adapted to cut the grilled articles into small chip-like pieces, a continuously moving conveyor system having basket-like receptacles adapted to receive said chip-like pieces after being cut, means at the discharge end of said cutting device adapted to direct said chip-like pieces into said baskets, a container disposed below said last conveyor adapted to contain a deep frying fat into which said baskets with their contents will dip and move in a continuous manner as they travel along the underside of said conveyor, and means intermediate the ends of the upper portion of said conveyor adapted to tilt said baskets and discharge the contents thereof from the machine.

MIGUEL SANTILLAN.